Dec. 20, 1960  A. C. S. VAN HEEL ET AL  2,964,997
HORIZON CAMERA OBJECTIVE LENS SYSTEM
Filed June 24, 1957  2 Sheets-Sheet 1

INVENTORS.
ABRAHAM C. S. VAN HEEL
GERARDUS J. BEERNINK
HENDRIK J. RATERINK
BY
Lawson and Taylor Dec. 20, 1960 A. C. S. VAN HEEL ET AL 2,964,997
HORIZON CAMERA OBJECTIVE LENS SYSTEM
Filed June 24, 1957 2 Sheets-Sheet 2

INVENTORS.
ABRAHAM C. S. VAN HEEL
GERARDUS J. BEERNINK
HENDRIK J. RATERINK
BY

United States Patent Office 2,964,997
Patented Dec. 20, 1960

2,964,997

HORIZON CAMERA OBJECTIVE LENS SYSTEM

Abraham C. S. van Heel, Delft, Gerardus J. Beernink, The Hague, and Hendrik J. Raterink, Delft, Netherlands, assignors to Nederlandse Organisatie voor Toegepast - Natuurwetenschappelijk Onderzoek ten Behoeve van de Rijksverdediging (The National Defence Research Council T.N.O.), The Hague, Netherlands, a corporation of the Netherlands Filed June 24, 1957, Ser. No. 667,392

Claims priority, application Netherlands June 29, 1956

3 Claims. (Cl. 88—57)

Horizon cameras are known per se. In order to make a photograph of substantially 360° of the horizon, it is known to use a camera in which a film is mounted in a vertical cylindrical plane and which comprises an objective lens which can be rotated around said plane over 360°. If the film has a fixed position and the objective is rotated stepwise, a series of photos has to be made and to that end the shutter of the objective has to be opened a number of times before the whole horizon is taken.

In order to obviate the drawbacks involved it is known to rotate the objective over 360° with an open shutter; however, at the same time the film has to be moved in an opposite direction, in such a way that the image and the film do not move relative to each other during the moving period. The drawback is, however, again the necessity of a separate construction for the transport of the film, while the drawback of a moving objective remains. The duration of the entire shot is relatively long so that such a camera cannot be used from moving objects such as an aeroplane.

It is also known to use a camera with an annular lens, which causes an image of substantially 360° of the horizon on a flat film, positioned e.g. above the lens, with a single photo. However, the drawback of this camera is that this gives a flat circular image of the entire horizon which shows a strong disproportion. On the other hand if a photo of the horizon is taken with a camera, as mentioned above, comprising a film which is tightened vertically and cylindrically, and a rotating objective, the photo has the shape of a strip and shows substantially no distortion.

The object of the present invention is to provide a lens system from a horizon camera in which the advantages of the two systems described above are combined.

Another object is to provide a horizon camera with which a photo is taken in one shot of substantially the whole horizon on a cylindrical film strip.

A further object is to provide a new and improved horizon camera with which photos can be taken of substantially the whole horizon and which can be mounted to the outside of an aircraft.

The horizon camera according to the invention has a compound objective lens and a film, tightened along a cylindrical plane, the centre line of which coincides with the centre line of the objective, while the light enters the objective substantially perpendicular to the centre line thereof. The objective preferably consists of an annular lens and three other glass bodies of a particular shape, together constituting an optical system with which substantially the whole horizon can be photographed in one shot on a cylindrical circumference of a glass body which forms part of the objective system.

Since the last-mentioned glass body is cylindrical at the outside, it is of advantage to tighten the film around this cylindrical part. Only a very small part of the circumference thereof is necessary for supplying and carrying off the film, so that an image of the horizon of nearly 360° is obtained.

An embodiment of the invention is hereinafter described, by way of example, with reference to the accompanying drawings, in which Fig. 1 shows a section through the optical system;

Figure 1:
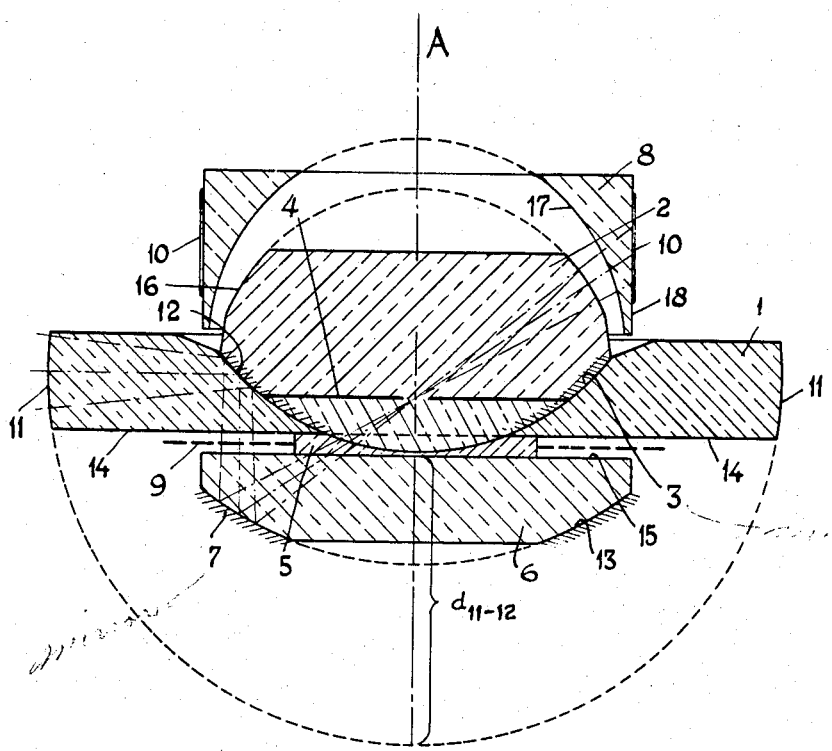

The optical system of the horizon camera consists of an annular lens 1 which is cemented to the ball-shaped part of the glass body 2. The cemented interface between the two glass bodies is provided with an aluminum mirror 3 on the side of the annular lens. The glass body 2 consists of 2 parts, between which the diaphragm or stop 4 is cemented. On the part of the ball-shaped glass body 2 protruding beyond the ring-shaped lens 1 a disc-shaped glass body 5 is cemented. On the flat under side of this disc-shaped glass body 5 the glass body 6 is cemented, the convex surface of which or at least the active part thereof is again provided with an aluminum mirror 7. The glass bodies which are thus cemented to each other form one concentric whole. Above this and entirely clear thereof there is situated the glass body 8, the outer circumference of which is cylindrical.

The course of the light rays in the optical system described above is now as follows.

The light rays, originating from the horizon panorama enter through surface 11. The camera is preferably positioned in such a way that a ray originating from the horizon itself is incident on the surface 11 perpendicular to this surface and perpendicular to the central axis of the objective. The surface 12 provided with an aluminum mirror 3 reflects the light ray to the surface 13 which is also provided with an aluminum mirror 7. The gap of air between the surfaces 14 and 15 is passed freely, since the surface 12 has been chosen in such a way that after reflection on this surface the direction of the light ray originating from the horizon is parallel to the central axis A of the objective.

The light rays are then reflected by the aluminized surface 13 to the stop 4. Thereby they pass the non-aluminized part of the surface 12. The shape and position of the reflecting surface 13 have been calculated in such a way that this surface almost entirely eliminates the astigmatism caused by the reflecting surface 12. The remaining astigmatism is later on compensated for by surface 17. After having passed the diaphragm 4 the light rays leave the glass body 2 substantially perpendicular to surface 16 and form an image on the cylindrical outer wall 18 after a small refraction at surfaces 17 and 18.

The shutter 9 is preferably present in the gap of air between the surfaces 14 and 15. If desired, it is possible to position it in the spaces between the surfaces 16 and 17, although this is not so favourable for obtaining a minimum of vignetting.

The film 10 is tightened along the cylindrical outer wall 18 of glass body 8, which is mounted rotatably around a shaft 44, the axis of which coincides with the optical axis, which shaft is fixed to the camera casing 22 (fixing joint not shown in the drawings).

Teeth can be cemented on the circumference of the cylinder wall 18 in such a way that they correspond with the film perforation.

With the exception of surface 11 of the annular glass body 1 it is possible to build the optical system in a camera casing.

In order to protect the surface 11 and the shutter mechanism 9 an annular cover 19 is provided. This cover can slide down over the fixed cylindrical dome 20. This dome 20 is connected with the proper casing 22 by means of an arm 21 which is present just in the blind spot, opposite the place where the supplying and carrying off mechanism of the film are present.

In a very convenient embodiment of this lens system the various dimensions were as follows (in millimetres):

| | |
|---|---|
| $r_{11} = +54.10$ | $d_{11-12} = +43.55$ |
| $r_{12} = +36.05$ | $d_{12-14} = + 2.15$ |
| $r_{14} = \infty$ | $d_{14-15} = - 2.70$ |
| $r_{15} = \infty$ | $d_{15-13} = -15.40$ |
| $r_{13} = +54.10$ | $d_{15-16} = +53.60$ |
| $r_{16} = -30.05$ | $d_{16-17} =$ about 7 (adjustable) |
| $r_{17} = -30.05$ | |
| $r_{18} = 31.45$ (cylindrical surface) | |

(Axial thickness annular body 1 = 14.25)

$r_n$ being the radius of curvature of the surface $n$ and $d_{n-n'}$ being the axial distance between surfaces $n$ and $n'$ where $n$ equals a given surface and $n'$ equals a surface following $n$.

Type of glass: barium crown 541/595 with $n_d = 1.5406$. The centre of the stop coincides with the centre of curvature of surface 16. The diameter of the stop is 3.6 millimetres. The focal length of this lens system amounts to 25.7 millimetres. A length of 200 millimetres of the negative corresponds with 360 degrees; the height of the image amounts to about 7.5 millimetres, covering a field of view from eight degrees below the horizon up to eight degrees above the horizon. The time of exposure is fixed at about 1/40 second.

About 15 to 20 degrees of the horizon are lost on the blind spot where the film is supplied to and carried off the system (which blind spot coincides with the section blinded by the supporting arm 21 of the camera).

No high precision is needed for centering the optical parts; the adjustment of the cylindrical surface 8 in axial direction is not critical.

A recommendable film speed is 17/10 Din = 40 ASA for bright sun and 22/10 Din = 125 ASA for cloudy weather.

Satisfactory shots have been taken at a flying speed of 250 miles/hour. However, flying speeds up to 600 miles/hour can be used.

The choice of the refractive index (type of glass) is not critical, it may vary between 1.48 and 1.64 for the D-line of sodium and the value of the dispersion member may differ from that of the barium crown glass mentioned above, because nearly everywhere in the lens system the light-rays are incident on the glass-air interfaces almost perpendicularly.

The ratio between the focal length and the dimensions of the objective may vary as follows:

| | | | |
|---|---|---|---|
| $r_{11}$ | 1 0-3 0 | $d_{11-12}$ | 1.2-2.3 |
| $r_{12}$ | 1 1-1 9 | $d_{12-14}$ | 0 01-0 2 |
| $r_{13}$ | 1 5 3 0 | $d_{14-15}$ | 0 0 2 |
| $r_{16}$ | 0 7-1 5 | $d_{15-13}$ | 0 4 0 8 |
| $r_{17}$ | 0 7-1 5 | $d_{15-16}$ | 1 5 3 0 |
| $r_{18}$ | 1.0-1 5 | $d_{16-17}$ | 0.1-0 6 |

Preferably $r_{16} = r_{17}$ and $r_{11} = r_{13}$ but they need not be exactly identical.

In order easily to measure out the negatives the cylindrical surface 18 may be provided with an engraved index line and graduated scale. They are then visible on the negatives, the influence of a possible elongation or shrinkage of the film strip during developing or storing being eliminated for the greater part.

Figure 2:
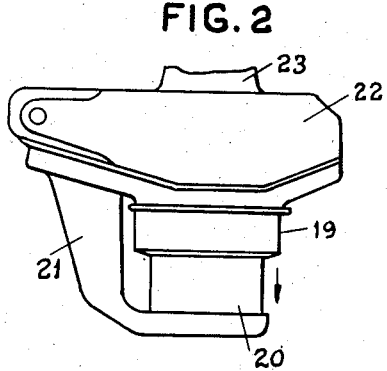
Fig. 2 shows diagrammatically a side-view of the camera.

Since the field of vision of the optical system is sufficiently above and below the horizon, it is advantageous to mount the camera casing 22 either on the roof of an aircraft or preferably in a reversed position below the floor of an aircraft e.g. by means of a suitable connection device 23 (Fig. 2).

The diameter of the stop may vary between 0.1 and 0.2 times the focal length.

Since both the glass body 8 and the light sensitive film are situated very close above (or under) the annular lens 1 and this lens needs an undisturbed annular view of about 10 degrees above and below the plane perpendicular to the central axis of the lens system (apart from the supporting arm 21) it is not possible to put both film spools in substantially the same plane as glass-body 8.

Figure 3:
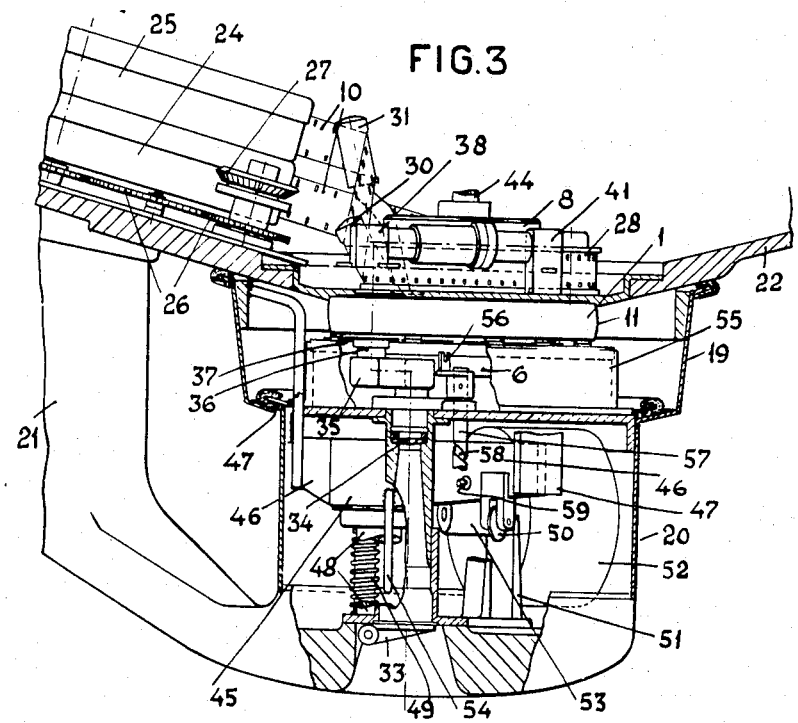
Fig. 3 shows a vertical cross-section and partial view of part of the apparatus.
Figure 4:
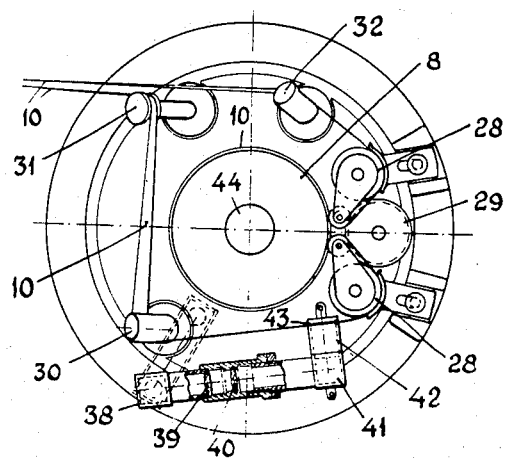
Fig. 4 shows an upper view of the film transport section.

Therefore we have positioned the film spools 24 and 25 as shown in Figs. 3 and 4, 24 being driven by a gear mechanism 26 via a slip coupling 27.

The slip coupling 27 and both film sprockets 28 are driven by a motor and reduction gear mechanism which is not shown in the drawing but which are mounted in the space above the gear-wheel 29.

By means of three shafts 30, 31 and 32 placed under an appropriate angle with respect to the central axis the film 10 is led to the film spools 24 and 25.

Said motor is operated by remote control as is known in the art, which mechanism is not shown in the drawings.

In order to be able to ascertain later on where the photographs of the horizon were taken, it is advantageous to provide the camera with an additional optical system projecting an image of the surface of the earth below the camera on the film strip.

Said additional system is shown in Figs. 3 and 4 and comprises a protecting flap 33 which is mechanically coupled with cover 19, a lens 34, a double prism 35, lens 36, shutter 37 which lies in substantially the same plane as and is mechanically coupled with shutter 9, reflecting prism 38, lenses 39 and 40 and prism 41. Tube 42 is provided with a slit 43 through which the film 10 passes. Both shutter 9 and shutter 37 can be of any suitable commercial available type.

By means of straps 47 the cover 19 is mounted to a cover support 45 having three arms 46 (only two of which being shown in Fig. 3).

The support is slidably mounted on a shaft 48 which is fixed to the dome 20. A coil spring 49 is mounted to press the cover 19 against the casing 32. The cover support is guided by means of a guide roll 50 which can run between a forked guide 51.

A solenoid lever 52 with lever arm 53 (only partly shown in the drawing) is provided, with which the cover support 45 can be opened by an electrical remote control mechanism. The flap 33 is opened at the same time by means of pin 54 mounted to the cover support.

The shutter 9 is mounted on a shutter support 55 and is operated by means of the shutter release arm 56 mounted on a rotatable release shaft 57 which is provided with a spiral groove 58 through which a small roll 59 can slide, which roll is rotatably mounted on a pin which is fixed to one of the arms 46 of the cover support. By means of a similar shaft (not shown in the drawing) provided with a spiral groove and a lever at its upper side the shutters can be tightened when the cover 19 slams back to casing 22 under the pressure of coil spring 49.

It will be obvious that various alterations can be made without departing from the scope of the invention.

We claim:

1. An objective lens system for a horizon camera comprising three glass bodies having a common refractive index and a common longitudinal axis, the first of said bodies being annular and having plane parallel end faces, a convex outer peripheral surface having its center of curvature coincident with the center point of said body and a concave inner peripheral surface, the second of said bodies being disposed within said first body and having a convex end face disposed in the plane opening of one end face of the first body and a convex surface on the end portion thereof opposite from said convex end face, and the third of said bodies being disposed adjacent said one end face of the first body and having a concave end face engaging said convex end face of the second body and a convex surface on the end portion thereof opposite from said concave end face and having its center of curvature on said longitudinal axis, said inner peripheral surface, said convex end face, and said concave end face all having substantially the same radius of curvature from a center on said longitudinal axis, an annular diaphragm disposed coaxially in said second body and separating it longitudinally into two portions and said convex surface of the second body having its center of curvature substantially coincident with the center point of said annular diaphragm on said longitudinal axis, means on said inner peripheral surface and said convex surface of the third body for reflecting light rays and the two reflective surfaces having their centers and radii of curvature so relatively disposed as to reflect light rays extending from said outer peripheral surface onto said reflective inner peripheral surface into paths extending substantially parallel to said longitudinal axis onto said reflective convex surface and thence through said center point of the annular diaphragm and said convex surface of the second body, and a hollow cylindrical glass body for mounting film and disposed coaxially with said three bodies adjacent said convex surface of the second body and having a concave inner peripheral surface having its center of curvature on said longitudinal axis.

2. An objective lens system according to claim 1 wherein said third body includes a first cylindrical portion having said convex surface thereof and a plane surface parallel to and spaced from said one end face of the first body, and a second cylindrical portion connecting said convex end face of the second body and said plane surface and having a radius smaller than that of said outer peripheral surface of the first body and that of said first cylindrical portion and so related to said radii of curvature of said two reflective surfaces that said second cylindrical portion defines with said one end face and said plane surface an open annular space through which said light rays extend parallel to said longitudinal axis and for the insertion of shutter means.

3. An objective lens system according to claim 1 wherein the magnitude of the radius of curvature relative to the focal length of the lens system of the following surfaces respectively is about: said convex outer peripheral surface of the first body: 1.0–3.0; said concave inner peripheral surface of the first body, said convex end face of the second body, and said concave end face of the third body: 1.1–1.9; said convex surface of the third body: 1.5–3.0; said convex surface of the second body: 0.7–1.5; the outer cylindrical surface of said hollow cylindrical body: 1.0–1.5; and said concave inner peripheral surface of the hollow cylindrical body: 0.7–1.5.

References Cited in the file of this patent
UNITED STATES PATENTS

| | | |
|---|---|---|
| 2,410,842 | Scholz | Nov. 12, 1946 |
| 2,485,345 | Ackerman | Oct. 18, 1949 |
| 2,638,033 | Buchele | May 12, 1953 |
| 2,794,379 | McNeil | June 4, 1957 |

FOREIGN PATENTS

| | | |
|---|---|---|
| 15,188 | Great Britain | of 1908 |
| 258,755 | Great Britain | Sept. 30, 1926 |
| 246,761 | Germany | May 10, 1912 |